United States Patent [19]

Nakajima

[11] 3,823,946

[45] July 16, 1974

[54] TOY GRAMOPHONE

[75] Inventor: Takamitsu Nakajima, Tokyo, Japan

[73] Assignee: Tomy Kogyo Co., Ltd., Tokyo, Japan

[22] Filed: Apr. 30, 1973

[21] Appl. No.: 355,703

[52] U.S. Cl. .................................. 274/9 R, 274/1 A

[51] Int. Cl. ............................................ G11b 3/00

[58] Field of Search........ 274/1 A, 7, 9 R, 14, 15 R; 242/57

[56] References Cited

UNITED STATES PATENTS

| | | | |
|---|---|---|---|
| 3,401,942 | 9/1968 | Strauss | 274/1 A |
| 3,467,393 | 9/1969 | Kuwayama | 274/9 R |
| 3,547,448 | 12/1970 | Chang | 274/1 A |
| 3,633,923 | 1/1972 | Watanabe | 274/7 |
| 3,721,449 | 3/1973 | Sirinek | 274/1 A |

*Primary Examiner*—Louis R. Prince
*Assistant Examiner*—John W. Shepperd
*Attorney, Agent, or Firm*—Staas, Halsey & Gable

[57] ABSTRACT

A gramophone for incorporation within a toy provided with a housing having a rotatably mounted door which may be opened and closed, as desired, a spindle reciprocably mounted to the door so as to normally extend into the housing, the spindle being provided with a continuous electrical contact at one end thereof, a turntable mounted on the spindle and an interchangeable sound disc supported thereon, a motor mounted within the housing and arranged such that the shaft thereof directly engages and drives the turntable, a pick-up arm provided with a platform within which is mounted a stylus, the arm normally being urged by a spring such that the stylus engages the sound disc at the beginning thereof, appropriate electrical means operatively connecting a source of energy to the motor, including a pair of electrical conductive prongs normally engaging the electrical contact of the spindle so as to complete the circuit, one of the prongs being positioned in the path of rotation of the platform such that when the stylus reaches the end of the sound disc the platform engages and pushes the prong away from the electrical contact of the spindle opening the circuit, a speaker cone mounted within the housing such that the platform of the arm makes sliding contact with the apex of the speaker cone during movement of the stylus across the sound disc and a manually operated actuating member for moving the reciprocably mounted sound disc and spindle toward the door of the housing thus disengaging the stylus from the grooves of the sound disc permitting the arm to return to its starting position.

6 Claims, 7 Drawing Figures

TOY GRAMOPHONE

BACKGROUND AND SUMMARY OF THE INVENTION

The present invention relates generally to gramophone devices for incorporation within a toy. Such toy gramophone devices comprise a rotatably mounted sound disc and a pick-up arm provided with a stylus mounted for movement across the face of the disc such that the stylus follows a sound groove cut in the disc. A speaker cone is mounted above the pick-up arm and is fixed with respect to the path of movement thereof. The pick-up arm is provided with a transversely extending platform in the region of the stylus for making sliding contact with the apex of the speaker cone for transmitting sound vibrations derived from the stylus, as same vibrates under the influence of the sound groove, to the speaker cone.

In the toy gramophone invention disclosed herein the spindle and turntable associated therewith are mounted to the door of the housing permitting the child to simply open the door and exchange sound discs, as desired. Moreover, the feature of interchanging sound discs is incorporated into a new gramophone device wherein the number of parts is reduced and operation simplified with resultant low cost of manufacture and reliability of use. Particularly, the shaft of the motor is permitted to directly drive the turntable while the electrical circuit is automatically broken as the stylus reaches the end of the sound disc, while simply depressing a push button mechanism automatically returns the stylus to its starting position and closes the circuit at which time the same or a new record is played.

DESCRIPTION OF THE PREFERRED EMBODIMENT

Figure 3:
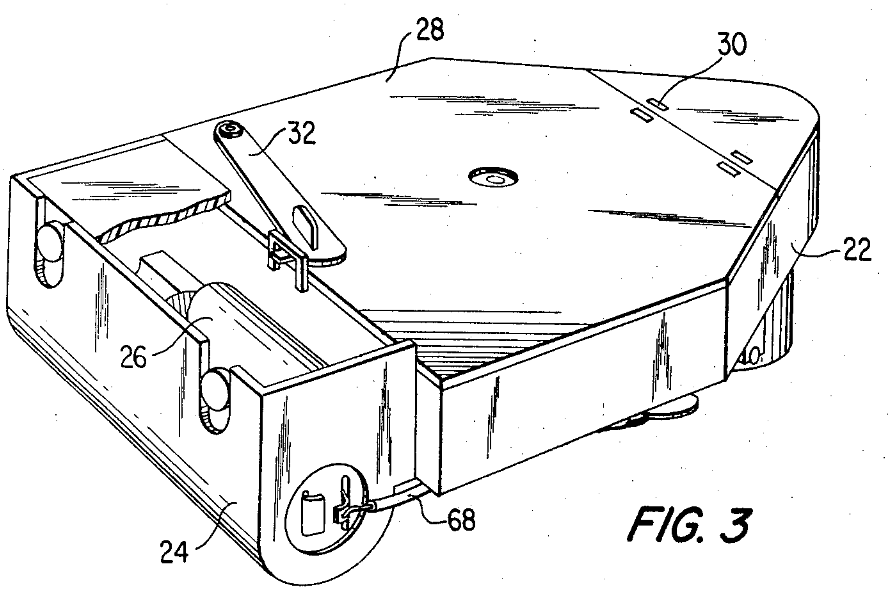
FIG. 3 is a perspective view of the lower section of the housing illustrating the door rotatably mounted to the bottom thereof providing access to the spindle and turntable permitting the exchange of sound discs.
Figure 4:
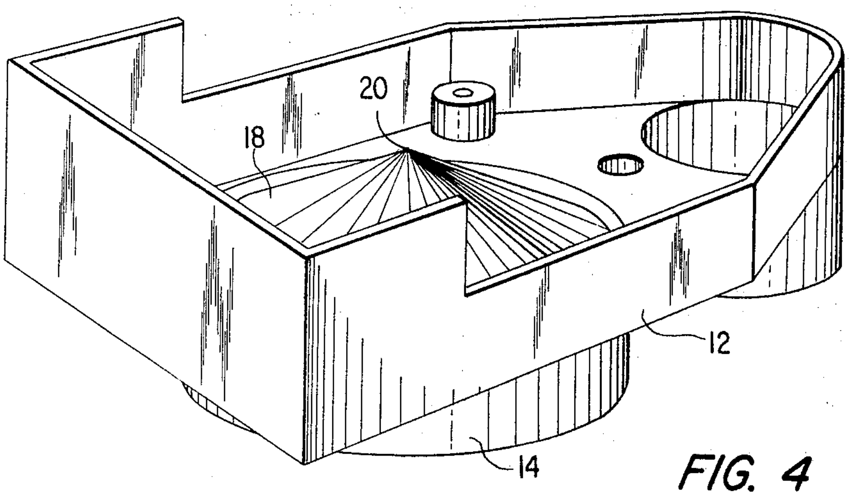
FIG. 4 is a perspective view of the upper section of the housing illustrating the bottom surface thereof and in particular the speaker cone disposed therein.

The toy gramophone device of the present invention is designated generally by the reference numeral 10 and comprises, as illustrated in FIGS. 1 – 4, an upper section 12 having an upstanding cylindrical wall 14 within which an ornamental grill 16 is provided. A speaker cone 18 terminating in apex 20 is fixedly secured within the upper section 12, as illustrated in FIG. 4.

Figures 1, 2:
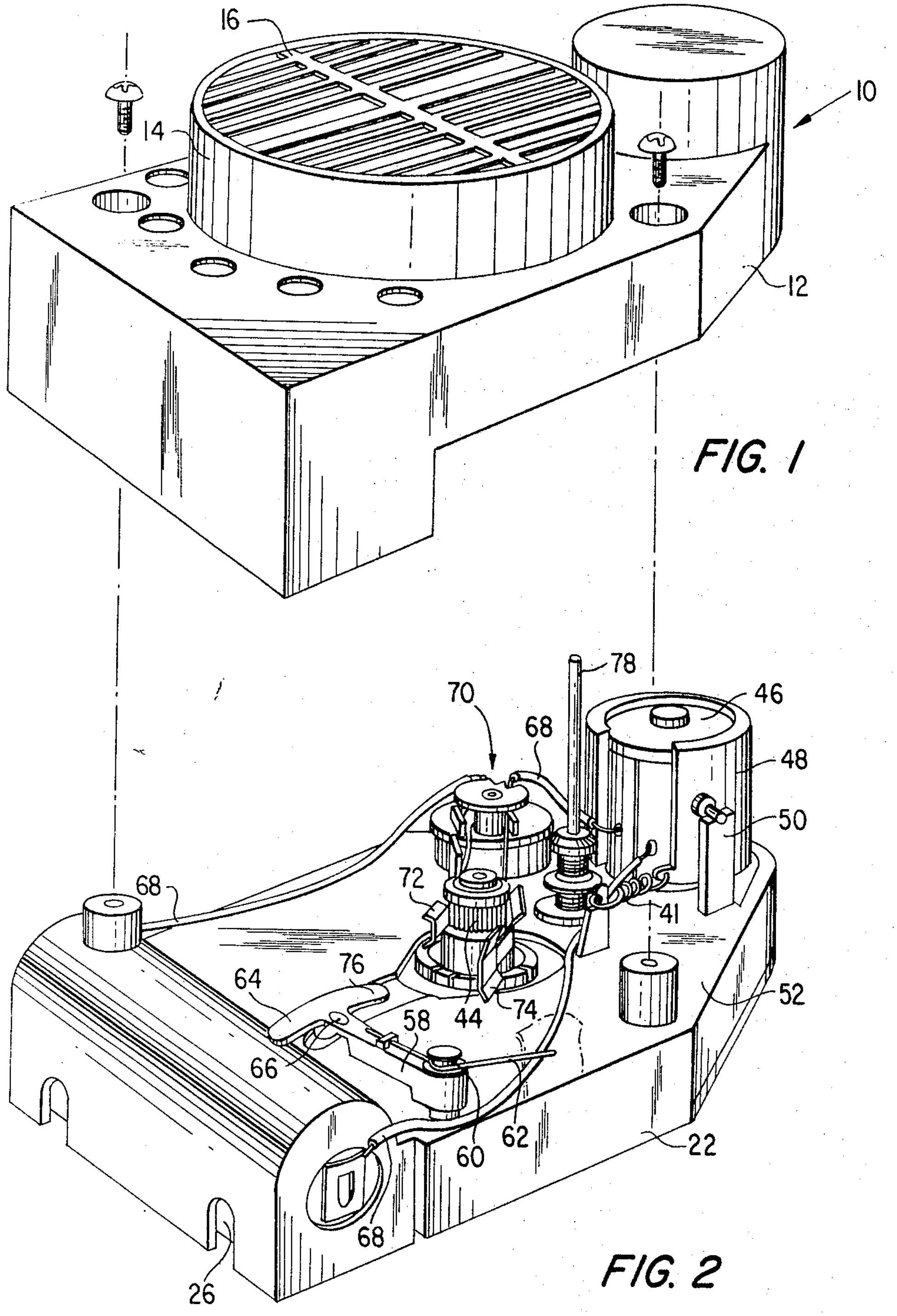
FIG. 1 is a perspective view illustrating the upper section of the housing, the speaker cone being mounted directly below the grill.
FIG. 2 is a perspective view of the lower section of the housing illustrating the motor, rotatably mounted pick-up arm with stylus, and a pair of electrical prongs engaging a continuous electrical contact formed at the top of the rotating spindle thus closing the electrical circuit.

The reference numeral 22 designates the lower section of the housing which, as illustrated in FIGS. 2 – 3, is provided with a compartment 24 within which a source of electrical energy, for example, a battery 26, is located. One side of the lower section 22 is provided with a door 28 mounted for rotation about hinges 30 and provided with a latching element 32.

Figure 5:
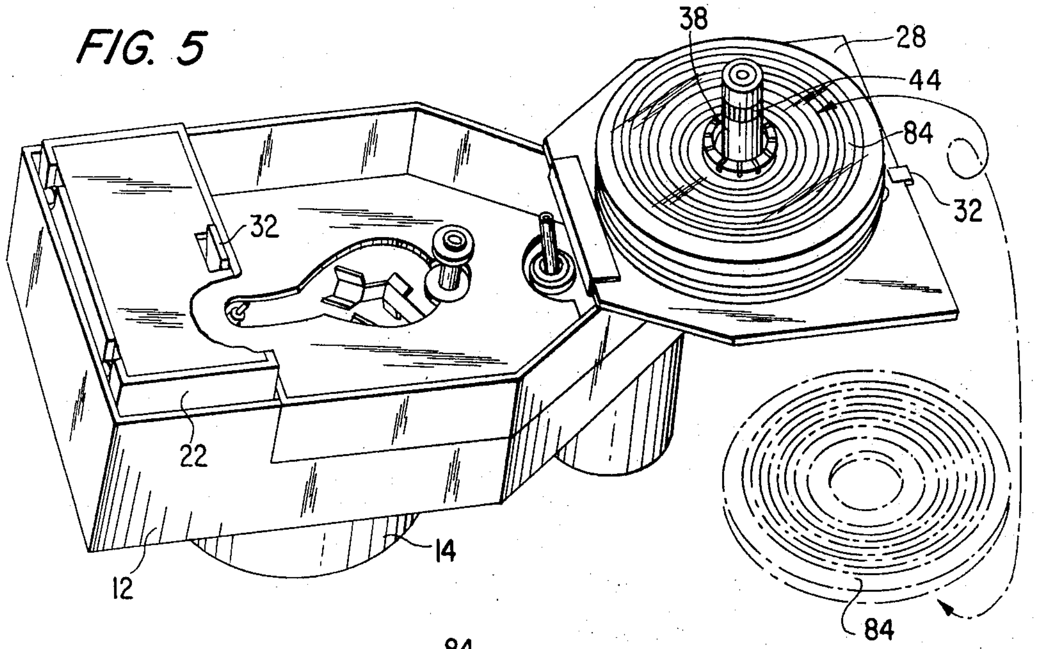
FIG. 5 is a perspective view of the assembled housing illustrating the door in open position wherein the sound disc may be exchanged.
Figure 7:
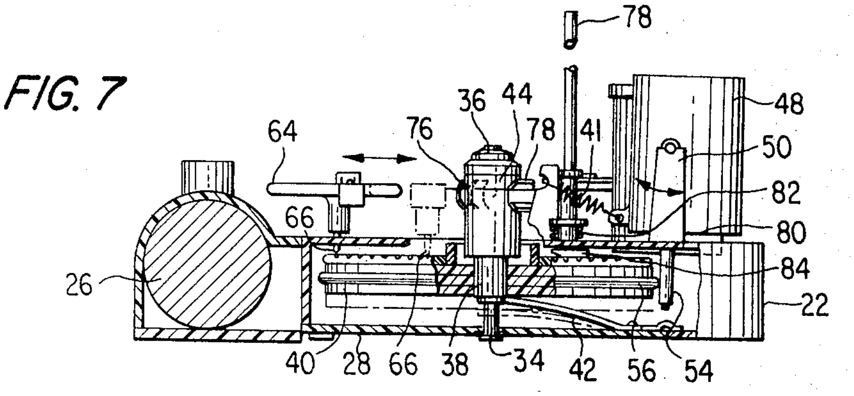
FIG. 7 is a cross sectional view taken along 7—7 of FIG. 6 illustrating in particular the manually operable system for moving the sound disc and turntable downwardly so as to release the stylus from the grooves of the sound disc permitting the arm to automatically return to its starting position.

Turning now to FIGS. 5 and 7, it will be noted that a shaft 34 is mounted to the door 28 and terminates upwardly in abutment 36. Mounted for rotation about the shaft 34 is the spindle 38 to which the turntable 40 is secured. As will be apparent from FIG. 7, the spring 42 normally urges the spindle 38 upwardly. The spindle 38 is provided at the top portion thereof with a continuous electrical contact member 44, the purpose of which will be described hereinafter.

As will be apparent from FIG. 2, a miniature electric motor 46, of conventional design, is appropriately mounted within a chassis 48 secured to the arms 50 extending upwardly from the wall 52 of the lower section 22. The motor 46 is provided with a shaft 54 which, as illustrated in FIG. 7, engages a resilient belt 56 mounted within the side wall of the turntable 40. The spring 41 normally urges the shaft 54 into engagement with the belt 56. Thus, the turntable 40 is directly turned by the rotation of the shaft 54 of the motor 46.

Figure 6:
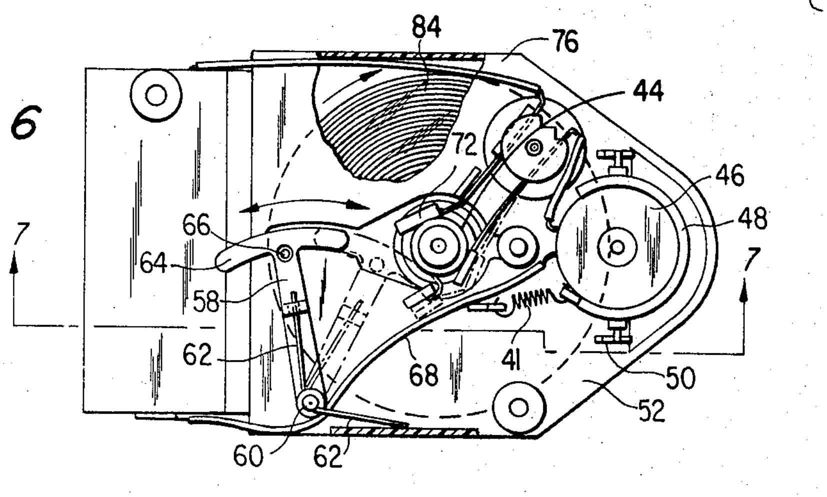
FIG. 6 is a top plan view of the lower section of the housing with a portion thereof removed so as to expose the sound disc.

Turning now to FIGS. 2 and 6, it will be noted that the reference numeral 58 designates a pick-up arm mounted for rotation about the shaft 60 secured to the lower section 22. A small spring element 62 secured at one end to the arm 58 and bearing at the other end against the upper section 12 normally urges the arm 58 counterclockwise into the position illustrated in FIG. 6. The arm is provided with a laterally extending platform 64 within which is mounted the stylus 66. As the sections 12 and 22 are assembled, it will be apparent that the platform 64 engages the apex 20 of the speaker cone 18 at all times.

As further illustrated in FIGS. 2 and 6, wires 68 operatively connect the battery 26 and the motor 46 through a switching mechanism designated generally by the reference numeral 70. The switching mechanism 70 comprises two electrically conductive prongs 72 and 74 connected in series to the wires 68 and normally engaging the electrical conductive contact 44 formed at the upper part of the spindle 38. As will be apparent from FIG. 6, the prong 74 is positioned in the path of travel of the platform 64 of the arm 58, the purpose of which will be apparent hereinafter.

Finally, and as illustrated in FIGS. 2 and 7, a plunger generally designated by the reference numeral 78 terminates downwardly in an abutment 80. A spring 82 normally urges the plunger 78 upwardly, as illustrated in FIG. 7, such that the abutment 80 is spaced from the top of the sound disc 84. It will be apparent that the plunger 78 may be secured at its free end to any actuating button and that by depressing same the sound disc 84, the turntable 40 and the spindle 38 may be moved downwardly against the force of the spring 42 to the position illustrated in dotted lines.

The operation of the toy gramophone device of the present invention will now be described. Initially, it is noted that the gramophone may be used in a variety of toys, for example, dolls wherein the grill 16 and the actuating button attached to the plunger 68 are positioned on one side thereof and the rotatably mounted door 28 on the other side thereof. To exchange sound disc 84 it is only necessary to release the latching mechanism 32 thereafter rotating the door 28 to its open position. Thereafter, as illustrated in FIG. 5, the sound disc 84 is exchanged and the door 28 returned to its closed position. Thereafter, the child depresses the plunger 78 causing, as previously explained, both the sound disc 84, the turntable 40 and the spindle 38 to be pushed downwardly, as illustrated in FIG. 7. At this juncture, the stylus 66 is released from engagement within the last groove of the sound disc 84 thereafter permitting the entire arm 58 to rotate counterclockwise under the influence of the hair spring 62 to the position illustrated in FIG. 6 wherein the stylus is appropriately aligned with the initial portion of the groove at the periphery of the sound disc 84. It is to be noted that during the counterclockwise rotation of the arm 58, the right-hand portion 76 of the platform 64 disengages from the prong 74 permitting same to move backwardly into engagement with the conducting member 44 so as to complete the electrical circuit, at which time the rotating shaft 54 of the motor 46 causes the turntable 40 to move. The stylus 66 thereafter proceeds along the groove of the sound disc 84 in the usual manner during which time the platform 64 makes sliding contact with the apex 20 of the speaker cone 18 transmitting the sound vibrations from the stylus 66 to the speaker cone 18. As the stylus 66 reaches the end of the groove of the sound disc 84 the arm 76 of the platform 64 engages the electrical conductive prong 74 moving same out of engagement with the rotating electrical contact 44 opening the electrical circuit at which time the gramophone device is inoperative and, as previously explained, the sound disc 84 may be replaced, if desired.

I claim:

1. A gramophone device, comprising:

a housing;

a door rotatably mounted to said housing;

a spindle, means operatively mounting said spindle to said door for rotation and reciprocation, said spindle being provided with an electrical contact, a turn-table mounted on said spindle for rotation therewith and a sound disc provided with a continuous groove supported on said turn-table;

a motor and source of energy therefor mounted within said housing, and means operatively connecting said motor and said turn-table for rotating same;

a pick-up arm provided with a platform within which is mounted a stylus, means mounting said arm to rotate between a first position wherein said stylus is within the beginning of said groove of said sound disc and a second position wherein said stylus is within the end of said groove of said sound disc, and means normally urging said arm to said first position;

a speaker cone mounted with said housing such that said platform of said arm makes sliding contact with the apex of said speaker cone during movement of said arm between said first and second positions;

a pair of electrically conductive prongs mounted within said housing so as to normally engage said electrical contact of said spindle, circuit means electrically connecting said prongs to said motor and source of energy, means positioning one of said prongs in the path of travel of said platform of said pick-up arm such that as said stylus reaches said second position said platform engages said one prong removing same from engagement with said electrical contact member so as to open said circuit means de-energizing said motor; and means moving said sound disc out of engagement with said stylus of said pick-up arm permitting said pick-up arm to move to said first position at which time said one of said prongs returns into engagement with said electrical contact member of said spindle to close said circuit means energizing said motor.

2. A gramophone device as in claim 1, wherein said means moving said sound disc comprises a plunger operatively mounted for reciprocating movement within said housing, said plunger having an end adapted to engage and push against said sound disc so as to cause said spindle to reciprocate, and means normally urging said end of said plunger out of engagement with said sound disc.

3. A gramophone device as in claim 1, wherein said means operatively connecting said motor and said turntable for rotating same comprises a resilient band surrounding and continuously engaging the entire periphery of said turn-table, said motor being provided with a rotating shaft directly engaging said band, and means urging said shaft of said motor into engagement with said band.

4. In a toy gramophone device of the type having a housing, a door rotatably mounted to the housing, a spindle operatively mounted to the door for rotation and having a turn-table secured thereto upon which a sound disc is positioned, a motor within the housing and a source of energy for same, a pick-up arm provided with a platform within which is mounted a stylus, the arm mounted to rotate between a first position wherein the stylus is within the beginning of the groove of the sound disc and a second position wherein the stylus is within the end of the groove of the sound disc, a system for normally urging the arm to the first position, a speaker cone mounted within the housing such that the platform of the arm makes sliding contact with the apex of the speaker cone during movement of the arm between the first and second positions, the improvement comprising an electrical contact member mounted on the spindle, and a pair of electrically conductive prongs mounted within the casing and positioned on opposite sides of the spindle to normally engage the electrical contact member of the spindle so as to complete an electrical circuit operating the motor, one of the electrically conductive prongs being positioned in the path of travel of the platform of the pick-up arm such that as the arm reaches its second position the platform engages the one electrically conductive prong moving same away from contact with the electrical contact member of the spindle opening the circuit to stop the motor.

5. A toy gramophone device as in claim 4, wherein the spindle and turn-table are mounted for reciprocating movement with respect to the door and there is provided a plunger having an end adapted to engage and push against the sound disc permitting the spindle and turn-table to move away from the stylus releasing the arm to move from the second position to the first position under the influence of a spring.

6. A toy gramophone device as in claim 4, including a resilient member positioned around the entire periphery of the turntable, the motor being arranged such that the shaft thereof directly engages the resilient member so as to directly drive the turn-table.

* * * * *